Figure 1:
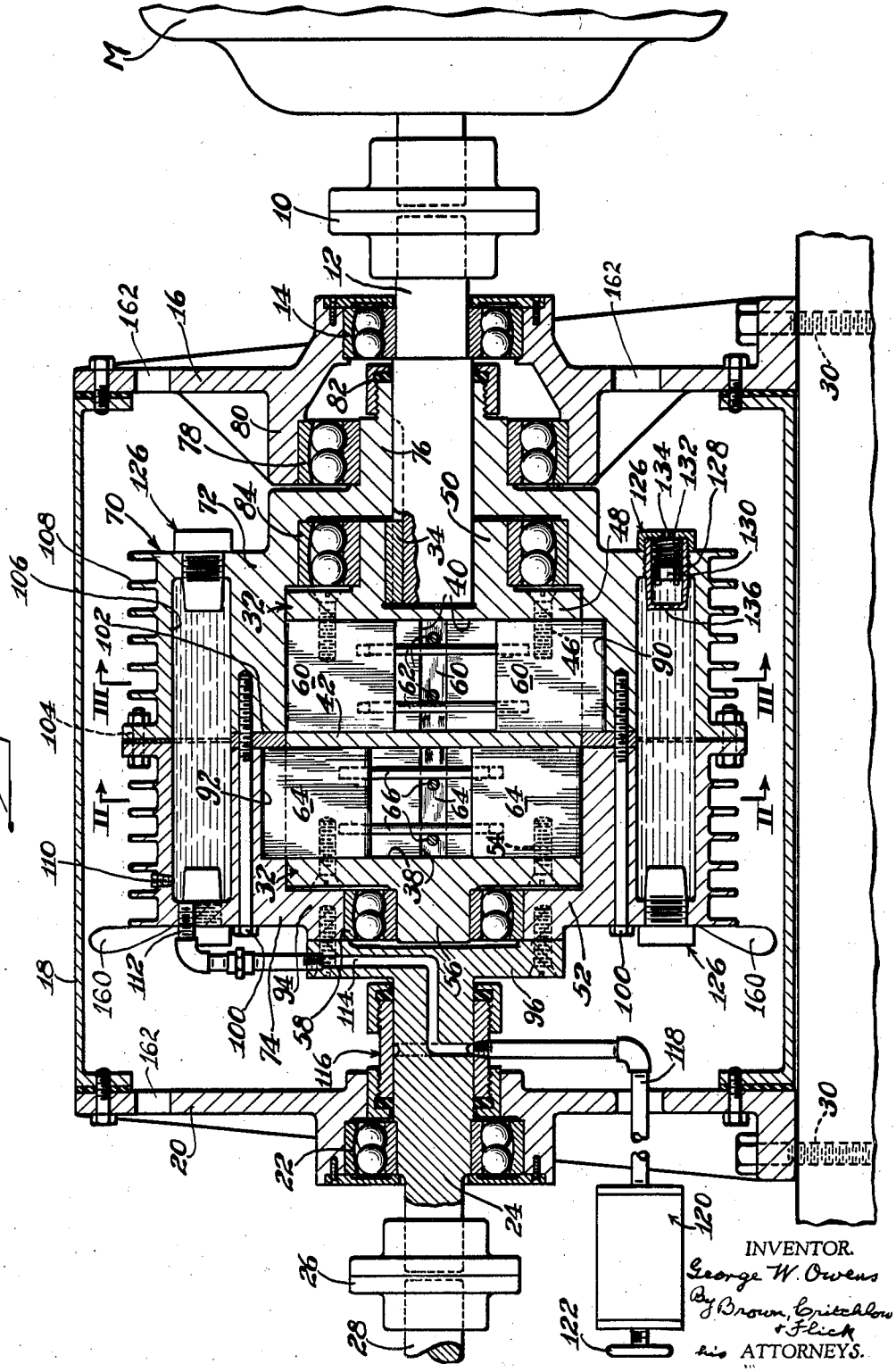

April 2, 1940.  G. W. OWENS  2,195,901
FLUID CLUTCH OR TRANSMISSION
Filed May 13, 1939  2 Sheets-Sheet 2

INVENTOR.
George W. Owens
BY Brown, Critchlow & Flick
his ATTORNEYS.

Patented Apr. 2, 1940

2,195,901

UNITED STATES PATENT OFFICE 2,195,901

FLUID CLUTCH OR TRANSMISSION

George W. Owens, Avalon, Pittsburgh, Pa.

Application May 13, 1939, Serial No. 273,492

16 Claims. (Cl. 192—58)

This invention relates to fluid clutches and transmissions, and more particularly is concerned with clutches and transmissions employing a liquid, such as oil or the like, to connect a drive and a driven shaft at a plurality of relative and controllable speeds.

Heretofore various types of fluid and liquid clutches and transmissions have been suggested and employed. One well known type, called the hydro-static type, has the drive shaft connected to a pump from which conduits convey the fluid to an adjacent or a remote fluid motor which is connected to the driven shaft. By varying the amount of fluid pumped by the fluid pump the relative speeds between the drive and driven shafts can be varied. While this type of fluid transmission is quite flexible and possesses the advantage of allowing the driven shaft to be remotely positioned and at any angle to the drive shaft, the system as a whole is expensive and space-consuming.

Another type of fluid transmission or clutch, called the hydro-kinetic type, necessitates that the drive and driven shafts be in alignment. In this type of fluid clutch or transmission an impeller wheel similar to an impeller wheel on a steam turbine is connected to or associated with the drive shaft. Fluid thrown centrifugally by the impeller wheel associated with the drive shaft strikes an impeller wheel connected to or associated with the driven shaft whereby the driven shaft is rotated. The force and amount of liquid thrown determines the relative speed of the driven shaft with that of the drive shaft. This type of transmission has a number of disadvantages which which include a time interval or buildup to effect an initial coupling action, and the inability to establish a one-to-one ratio between the drive and driven shafts.

A third type of fluid clutch or transmission employs a standard vane type of fluid pump with a valve controlling the flow of fluid through the outlet port of the pump. Either the drive or driven shaft is connected to the rotor of the pump and the other shaft is connected to the casing of the pump. The degree of opening of the valve controls the flow of fluid through the pump and the degree with which the drive shaft is allowed to turn faster than the driven shaft. An oil reservoir associated with the casing of the pump receives the oil from the valve outlet port of the pump and supplies oil to the inlet port. This type of transmission is perhaps the simplest of the several generic types mentioned but has always been open to the objection that a considerable amount of heat is generated by the valve control for the oil. The valve seats are wire-drawn and severe bearing wear and loss of oil or other fluid often occur.

It is the general object of my invention to avoid and overcome the foregoing and other difficulties attending the manufacture, sale, and use of fluid clutches and transmissions by the provision of an improved fluid clutch and transmission of relatively small size for any given horsepower so that it occupies a minimum amount of space, which is inexpensive to manufacture, but rugged and long-lived, which can be readily adjusted to give the desired ratio between a drive and a driven shaft almost instantaneously, which does not require the use of a motor and a pump, which does not include a valve, and which will operate continuously to give a fixed ratio drive over long periods and without the evolution of harmful heat.

Another and more specific object of my invention is the provision of a fluid transmission in which the operation of the transmission is controlled by controlling the fluid intake rather than by controlling the fluid output of a fluid pump.

Another object of my invention is the provision of a fluid clutch or transmission in which the relative speed between a drive and a driven shaft connected by the transmission is controlled through the application of fluid pressure to the transmission from a pressure producing master cylinder.

Another object of my invention is the provision of an improved liquid transmission including a multi-cylinder pump or more particularly a plurality of pumps positioned out of phase with each other so that a smoother transmission of power is effected.

Another object of my invention is the provision of a fluid or liquid clutch or transmission having a new and useful arrangement of parts and specifically including means for absorbing or dampening out a sudden load on the driven or even the drive shaft.

Figure 2:
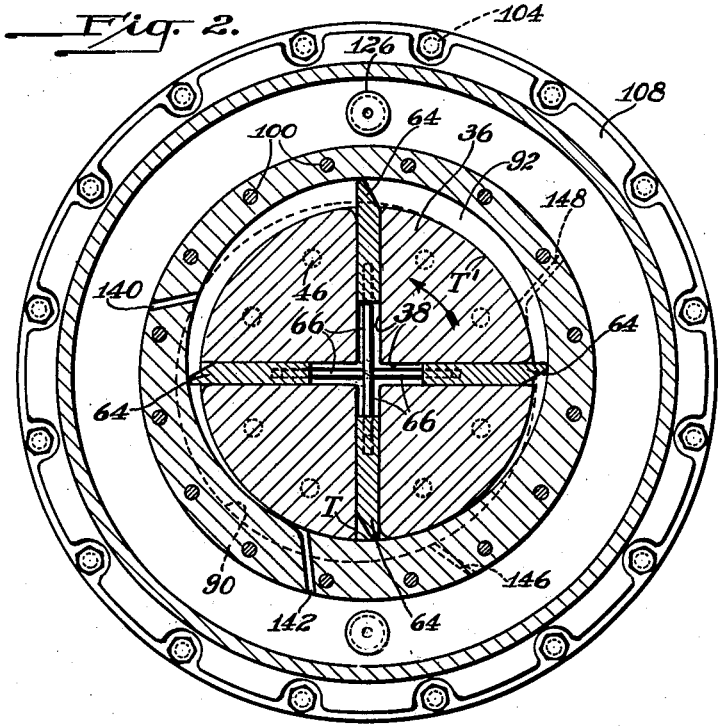
Figure 5:
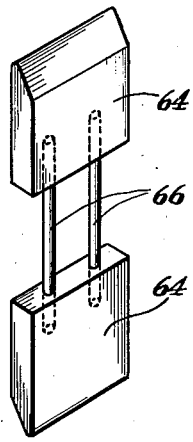
Figure 3:
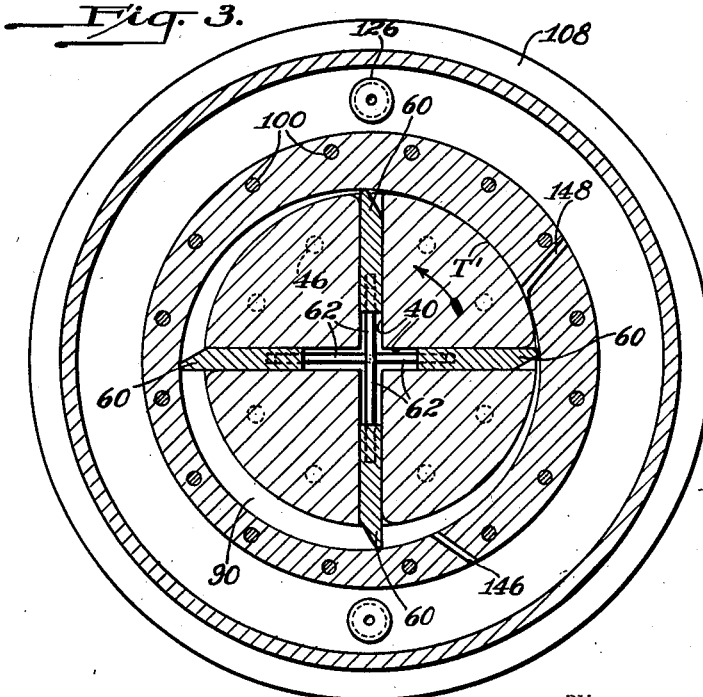
Figure 4:
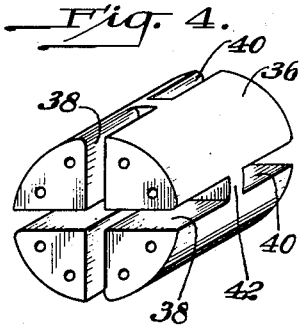
Figure 6:
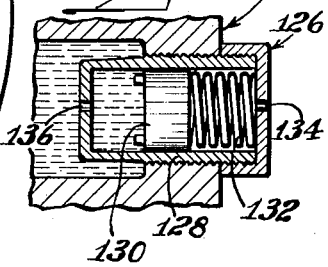

For a better understanding of my invention reference should be had to the accompanying drawings, in which Fig. 1 is a longitudinal vertical and diametric section through a fluid transmission embodying the principles of my invention; Figs. 2 and 3 are transverse cross sectional views taken respectively on lines II—II and III—III of Fig. 1; Fig. 4 is a perspective view of the rotor body forming a part of the apparatus; Fig. 5 is a perspective view of the blades or vanes associated with the rotor body of Fig. 4; and Fig. 6 is a longitudinal vertical sectional view of one of the cushioning means associated with the apparatus.

It will be understood that fluid transmissions constructed in accordance with my invention can be made in substantially any size and adapted to handle substantially any required horsepower. However, my invention particularly adapts itself to operations in conjunction with a constant speed electric motor. An induction motor having a constant speed is one of the best prime movers known so far as efficiency is concerned, and accordingly, I have illustrated my invention in conjunction with an induction or other electric motor marked M. It will be recognized that when my improved transmission is employed in conjunction with a constant speed electric motor or other prime mover that the advantages of inexpensiveness and high efficiency of the electric motor are coupled with the flexibility of my transmission to give any desired speed to a driven shaft. Furthermore, the losses due to friction and the like are relatively small in my transmission so that the resulting unit retains substantially the efficiency of the prime mover and possesses in addition the said variable speed flexibility.

Accordingly, in the accompanying drawings an electric motor M or other prime mover is coupled by means 10 of any desired type to a drive shaft 12 forming a part of my improved transmission apparatus. The drive shaft 12 is rotatably carried in a combined radial and thrust bearing 14 mounted in an end plate 16. The end plate 16 is connected by a housing 18 to an opposite end plate 20 which carries a combined radial and thrust bearing 22 which rotatably receives a driven shaft 24 which is coupled by any suitable means 26 to the shaft 28 of the apparatus to be driven. The end plates 16 and 20 and thus the entire housing of the apparatus are usually secured as by bolts or cap screws 30 to a frame or other foundation.

The drive shaft 12 carries a rotor head indicated as a whole by the numeral 32. To obtain flexibility between the rotor head 32 and the drive shaft 12 I generally connect these parts by a spline 34. The rotor head 32 includes a cylindrical body 36, shown individually in Fig. 4, which is formed with four slots 38 and 40 on each end which extend radially at each of the quadrants of a circle. The slots 38 at one end of the cylindrical body 36 are separated from the slots 40 at the other end of the body by a partition or wall 42 which is usually formed integral with the body. The cylindrical rotor body 36 is secured as by countersunk screws 46 to a round plate 48 formed with a hub portion 50 which receives the end of the drive shaft 12. A round plate 52 is secured as by countersunk screws 54 to the other end of the cylindrical rotor body 36. The plate 52 is provided with a stud 56 which is received in a combined radial and thrust bearing 58 carried by the casing of the rotary pump and hereinafter described.

The radial slots 40 formed at one end of the cylindrical rotor member 36 slidably receive blades or vanes 60. As clearly shown in Figs. 1 and 2, the blades 60 are secured together in pairs by pins 62 which are usually slidably received in openings drilled in the base of the blades.

Springs could be used to force the blades 60 out into contact with the casing of the fluid pump, as will be understood by those skilled in the art. However, using the pins 62 rather than springs simplifies the construction of the pump and the desired sealing of the blades 60 against the surrounding casing of the pump is achieved by the centrifugal force urging the blades outwardly when the pump is revolved at considerable speed by the motor M. In a like manner blades 64 are received by the slots 38 in the cylindrical rotor member 36 and pins 66 are used to align the blades in pairs.

Surrounding the blades 60 and 64 and the cylindrical rotor members 36 and plates 52 and 48 carried by the drive shaft 12 is the casing of the pump, indicated as a whole by the numeral 70. Although it will be understood that the casing 70 can be formed in any known or desired manner, it is conveniently made in two transversely split parts marked 72 and 74 in the drawings. The part 72 of the casing 70 is formed with a reduced end portion 76 which is carried in a combined radial and thrust bearing 78 mounted in a circular web 80 formed on the end plate 16 of the housing. A suitable sealing means 82 is usually provided between the reduced end portion 76 of the casing part 72 and the drive shaft 12. This sealing means may take any desired form as will be understood. The casing part 72 likewise surrounds a combined radial and thrust bearing 84 which engages with the outer periphery of the hub 50 associated with the drive shaft 12.

The casing part 72 is formed with a round cylindrical chamber 90 which is positioned eccentrically of the axis of the drive shaft 12 all in accordance with standard fluid pump practice and as hereinafter more particularly described. Suffice it to say here that the blades 60 rotate in the eccentric chamber 90 formed in the part 72 of the casing 70.

The part 74 of the casing 70 is formed with an eccentrically-positioned, round cylindrical chamber 92 which receives the rotor blades 64. Further, the part 74 of the casing 70 is provided with an inwardly extending flange 94 to which is secured a flange 96 formed integral with or associated with the driven shaft 24. The flange 94 surrounds and bears upon the radial and thrust bearing 58 heretofore described as receiving the stud 56 associated with the rotor member 32.

The two parts 72 and 74 of the casing 70 may be secured together by cap screws 100. A spacing washer 102 of the same longitudinal thickness as the partition wall 42 is clamped between the parts 72 and 74 of the casing by the cap screws 100. Each of the casing parts is formed with an outwardly and then longitudinally directed wall portion which portions are bolted together as at 104 to provide a sump or pressure chamber 106. The radially outer walls of the pressure chamber 106 may be provided with integral or associated cooling ribs 108 if desired.

Fluid may be placed in the pressure chamber 106 by removing a closure plug 110. Also communicating with the inside of the pressure chamber 106 is a conduit 112 which is connected to a passageway 114 formed in the driven shaft 24. A suitably packed connector ring assembly, indicated as a whole by the numeral 116, supplies fluid from a conduit 118 to the passageway 114 in the driven shaft 24. A master pressure cylinder of standard type having a screw-operated piston, and indicated as a whole by the numeral 120, is connected to the conduit 118. The master pressure cylinder 120 is illustrated as having a hand wheel 122 for operating the piston of the pressure cylinder. It will be appreciated, of course, that other means may be employed to operate the pressure cylinder, as for example, a foot pedal or hand lever, to thereby control the pressure in the pressure chamber 106.

The numeral 126 indicates a pressure cushioning unit which is associated with the pressure chamber 106 so that any sudden changes of pressure in the chamber are cushioned or absorbed. As will be evident from Fig. 6, the cushioning unit includes a cylinder 128 and a double piston 130 slidably received in the cylinder and backed by a compression spring 132. One end of the cylinder 128 is vented, as at 134, and the other end is open, as at 136, to the interior of the pressure chamber 106. When the pressure on the fluid in the pressure chamber becomes excessive the piston 130 is moved against the spring 132 to compress it and at the same time air is vented out of the opening 134 from behind the piston 130. Fluid under pressure from the pressure chamber, of course, engages with the side of the piston 130 remote from the spring 132 at all times inasmuch as the fluid under pressure from the chamber flows through opening 136.

An important part of my invention is the provision of a controlled intake for the fluid pump or pumps above described, together with a control of the flow of fluid from the outlet port or ports by pressure rather than by valve means. For a better understanding of this phase of my invention reference should be had to Figs. 2 and 3 which are sections taken respectively on lines II and III of Fig. 1. Having reference first to Fig. 2, the cylindrical rotor member 36 received in the eccentrically positioned cylindrical chamber 92 has a point of tangency at T with the inner surface of the chamber. Thus in the rotation of the member 36 in the direction shown by the arrow the blades 64 act in accordance with the standard fluid pump to provide what might be termed an intake, vacuum or suction stroke from the point T approximately to a point 180 degrees distant therefrom. In the remaining 180 degrees of travel each blade is acting on what may be termed a pressure or discharge stroke.

An essential feature of my invention is the elimination of any usual intake port in any part of the intake or suction stroke of each blade 64. Specifically, I place the intake port 140, see Fig. 2, at some part of the initial pressure or discharge stroke of each blade 64 and I have found one convenient point for such an inlet port to be approximately 115 degrees ahead of the point of tangency T. The inlet port 140 is of a relatively small bore whose diameter may be important to the correct functioning of my apparatus. The exact diameter of the port 140 may be found in practice by a trial and error method, but as one example of a typical port, I have found that in an apparatus in which the length of each blade 64 is approximately one inch and the cylindrical rotor member 36 is approximately 1⅜ inches in diameter and the internal diameter of the cylindrical chamber 92 is 1₁⁶⁄₁₆ inches, the diameter of the inlet port 140 may be approximately ₁⁄₃₂ inch or slightly greater. The outlet port, marked in Fig. 2 by the numeral 142, is positioned substantially as usual, namely, about 22½ degrees in advance of the point of tangency T. The diameter of the outlet port may be similar to that of the inlet port or perhaps slightly greater.

In a similar manner the fluid pump formed by the blades 60 and operating in the cylindrical, eccentrically-positioned chamber 90 is formed with an inlet port 146 positioned about 115 degrees ahead of the point of tangency T' between the cylindrical rotor member 36 and the eccentric chamber 90. The outlet port 148 is positioned approximately 22½ degrees in front of the point of tangency T'.

As particularly illustrated in Fig. 2 of the drawings, the point of tangency T of the eccentric cylinder 92 is approximately 135 degrees ahead of the position of the point of tangency T' of the eccentric cylinder 90. This relation of the points of tangency insures a smoother operation of the apparatus as will be explained in detail hereinafter. Suffice it to say here that when one of the blades 64 of one pump has just actively completed a pressure stroke, namely, the blade is just moving by the outlet port 142, one of the blades 60 is actively beginning or is in the middle of an active pressure stroke to discharge fluid out of the outlet port 148. Similarly, as soon as one of the blades 60 has passed the outlet port 148, the next blade 64 has already begun an active pressure stroke. It should be noted here that by increasing the number of blades in the rotor member 36 any need for a pair of pressure chambers or pumps would be eliminated. For example, on larger sized forms of my apparatus a single rotor member can carry anywhere up to nine or more blades and effect the smoothest type of pressure discharge operation. However, I have found that when machine design or purposes of convenience result in a given rotor carrying only two to six or so blades that my apparatus operates more smoothly when a pair of pumps or pressure chambers are positioned end to end in axial alignment, in the manner shown in Figs. 1 to 3 of the drawings, and these pumps or eccentric chambers are offset circumferentially from each other as by making the points of tangency T and T' at an angle of approximately 135 degrees with each other. Naturally, I may employ more than two fluid pumps or pressure chambers in end to end relation and offset the points of tangency in an appropriate manner so that the individual blades carried in each pump or pressure chamber come into their pressure stroke in turn to give a very smooth action.

In the operation of my improved fluid clutch or transmission the pressure chamber 106 is filled with oil or other suitable fluid or liquid and this may be achieved by the combined operation of the master cylinder 120 and the plug 110 so that all air is exhausted from the system. Let it be assumed that the motor M is energized and connected to the drive shaft 12 for rotating it and the rotor member 36 at a constant speed, and that the hand wheel 122 is adjusted so that the master cylinder 120 produces a negative pressure on the oil in chamber 106 substantially equal to the negative pressure produced by chamber 92. Now since the operation of the blade 64 in the chamber 92 is exactly similar to the operation of the blades 60 in the chamber 90, only the operation of one set of blades will be considered. With the rotor member 36 turning the blades 64 at a constant speed relative to the casing 70 and the chamber 92, then, upon the movement of each blade 64 from the tangent T to a point approximately 180 degrees opposite, a vacuum will be created in the chamber following each blade. However, no oil can get into this particular chamber behind each blade from the pressure chamber 106 because there is no inlet port connecting these two chambers. But after the blade has traveled further around to and has just passed the inlet port 140 there will be a tendency for fluid in the pressure chamber 106 to flow through the inlet port 140 into the evacuated chamber behind the blade which has just passed the inlet port. The reason for this tendency of the fluid to flow through inlet port 140 is the pressure head of the oil in chamber 106. However, except for this pressure head the pressure on the fluid in the pressure chamber 106 is the same as that in the chamber 92, and inasmuch as inlet port 140 is very small and the rotor is turning at a relatively high speed which provides only a very small time interval for the space between any two bades in chamber 92 to have communication with port 140, substantially no fluid will flow into the chamber behind the blade 64 which has just passed the inlet port 140. Whatever slight amounts of oil happen to enter chamber 92 through port 140 will be expelled from the chamber through port 142 by the blades 64 without providing any driving torque, due to the relatively low pressure on the fluid in chamber 106 at the exit end of outlet port 142. Accordingly, the rotor member 36 turns freely in the chamber 92 and no motion is given to the casing 70 or to the driven shaft 24. When the pressure in the chamber 106 is the same as that in the chamber 92 the pressure may be below atmospheric. If this is the case the pistons 130 are moved completely to the left-hand ends of the cylinders 128 and the extra fluid put into the system is compensated for by the master cylinder 120. Usually the master cylinder adjustment to idling position moves the pistons 130 as described.

Now, assuming that the operator desires to operably connect the driven shaft 24 to the drive shaft 12, the hand wheel 122 on pressure cylinder 120 is turned to place a given pressure on the oil in the pressure chamber 106. Now, after a given blade 64 passes the inlet port 140, oil under pressure is forced into the evacuated chamber behind the blade. The continued rotation of the member 36 prevents the chamber from being completely filled before the next blade 64 passes the inlet port 140 and cuts off the flow of oil into the chamber. With a relatively light pressure in the pressure chamber 106 as effected by the pressure of the master cylinder 120, the chamber behind each blade will only be filled say ten per cent of its volume. Thus in the pressure or discharge stroke of each blade 64 only a relatively small amount of oil has to be passed through the outlet port 142. Inasmuch as this forcing out of the oil through the outlet port 142 can not be instantaneous the rotor member 36 will pick up the casing 70 connected to the driven shaft 24 and turn the casing at a speed which will have a direct and constant ratio to the speed of the drive shaft 12 so long as the pressure of the master cylinder 120 and the pressure cylinder 106 remains constant. Ordinarily the speed of the driven shaft 24 will be a comparatively small fraction, such as $\frac{1}{10}$ of the speed of the drive shaft.

Now, if the pressure in the master cylinder 120 is increased by further tightening the hand wheel 122, a greater differential will exist between the pressure in the evacuated chamber behind the blade 60 just after it passes the inlet port 140 and the pressure in the pressure chamber 106. Thus, a greater amount of oil will be forced into each evacuated chamber in turn. This greater amount of oil is discharged more slowly from the outlet port 142 by each blade 64 and the speed of the driven shaft 24 is correspondingly increased. Furthermore, the greater amount of oil forced into the evacuated chamber with greater pressure is due also to the fact that the relative speed between the rotor member 36 and the casing 70 is not so great and a longer time interval exists during which the chamber behind each blade is in communication with the inlet port 140. Thus, with a higher pressure the speed of the driven shaft with respect to that of the drive shaft may come up to approximately half that of the drive shaft. A further increase in pressure in the master cylinder 120 still further increases the speed of the driven shaft 24. In this manner any one of substantially any desired relative speeds between the drive shaft and the driven shaft can be obtained and once this desired speed is obtained it will remain substantially constant over long periods of operation.

If it is desired to obtain a one to one drive between the drive shaft and driven shaft the pressure in the master cylinder 120 is increased, as just described, up to a point where the driven shaft is rotating almost at the speed of the drive shaft. In other words, sufficient oil is being introduced through the inlet port 140 during the pressure intake so that the space behind each blade 64 is substantially filled and this entire amount of fluid must be discharged through the outlet chamber 142. The discharge of the fluid from the outlet port takes place at a much slower speed than does the intake of the fluid for the reason that the pressure differential between the opposite ends of the outlet port is much less than the pressure differential between the opposite ends of the inlet port 140. Now, when the discharge of fluid from the outlet port 142 is progressing very slowly, if the pressure on the master cylinder 120 is particularly increased, then the point is reached where the pressure at the outlet end of the outlet port is greater than or equal to the pressure at the inlet end of the outlet port. Hence no oil is discharged out of the outlet port and the casing 70 and the driven shaft 24 are rotated at the same speed as the rotor member 36 and drive shaft 12. Any possible leakage of oil past the tangent point T or elsewhere in the system either with the one to one drive or at any other relative speeds is compensated for without change of relative speed by the cushioning or displacement cylinders 126 as will be recognized by those skilled in the art.

I have found that speed variations of the drive shaft 24 substantially from zero up to almost the speed of the drive shaft can be achieved by relatively small pressure changes in the master cylinder 120. Further the locking of the rotor member 36 with the casing 70 to effect a one to one drive between the drive shaft and the driven shaft can be readily effected by adding pressure in an additional amount to the pressure cylinder which is capable of relatively high pressure if desired.

As heretofore explained, by placing a plurality of pumps or pressure cylinders in end to end alignment but in circumferentially offset relation any tendency to jerk or vibrate in my improved transmission is substantially eliminated even though a relatively small number of blades are used in each pump.

If during the operation of a machine from an electric motor having my transmission connecting the motor to a machine, a sudden overload on the machine occurs, the cushioning cylinders 128 absorb the increase in pressure or the necessary fluid displacement and the result is a cushioning or shock absorbing action between the motor and the machine.

As indicated in Fig. 1, I may secure a plurality of fan blades 160 to the outer periphery of one end of the casing 70 and provide the end plates 16 and 20 with openings 162 so that the rotation of the casing 70 causes a circulation of cooling air through the housing.

From the foregoing it will be recognized that the objects of my invention have been achieved by the provision of an improved fluid clutch or transmission which departs from and overcomes many of the objectionable features of prior known types of transmissions. I am able to drive either constant torque or varying torque machines or apparatus with my improved apparatus. I have materially reduced the expense and space requirements of certain known forms of fluid transmissions and have avoided the difficulties associated with the valve type of fluid transmission. My apparatus is inexpensive to build, easily installed and operated and functions over long periods substantially without attention or repair. It possesses the ability to transmit power at widely varying ranges of speed and high efficiency under instant and accurate control. Its ranges of use are wide and varied but will be grasped by those skilled in the art.

While I have particularly illustrated and described my advance in the art, all in accordance with the patent statutes, it should be particularly understood that my invention is not to be limited thereto or thereby but that it is defined in the appended claims.

I claim:

1. A fluid transmission comprising a rotary pump including a casing and a rotor adapted to provide suction and pressure strokes with respect to the casing, a driven shaft secured to the casing of the pump, a drive shaft secured to the rotor of the pump, an inlet port on the pump casing positioned beyond the suction stroke of the pump, an outlet port on the pump casing positioned adjacent the end of the pressure stroke of the pump, a pressure chamber connected to the inlet and outlet ports of the pump, and means to apply any desired pressure on the fluid in the chamber.

2. A fluid transmission comprising a rotary pump including a casing and a rotor adapted to provide suction and pressure strokes with respect to the casing, a driven shaft secured to either the casing or the rotor of the pump, a drive shaft secured to the remaining part of the pump, an inlet port on the pump casing positioned beyond the suction stroke of the pump, an outlet port on the pump casing positioned adjacent the end of the pressure stroke of the pump, a pressure chamber connected to the inlet and outlet ports of the pump, and means to apply any desired pressure on the fluid in the chamber.

3. A fluid transmission comprising a plurality of rotary pumps aligned axially but offset circumferentially, each pump including a casing and a rotor adapted to provide suction and pressure strokes with respect to the casing, a driven shaft secured to the casings of the pumps, a drive shaft secured to the rotors of the pumps, inlet ports on the casings of the pumps positioned beyond the suction strokes of the pumps, outlet ports on the casings of the pumps positioned adjacent the ends of the pressure strokes of the pumps, a pressure chamber connected to the inlet and outlet ports of the pumps, and means to apply any desired pressure on the fluid in the chamber.

4. A fluid transmission comprising a rotary pump including a rotor and a casing, a drive shaft connected to the rotor of the pump, a driven shaft connected to the casing of the pump, said pump having inlet and outlet ports, a chamber connected to the inlet and outlet ports, and means for supplying fluid under any desired degree of pressure to the chamber so as to control both the supply of fluid in through the inlet port and out of the outlet port.

5. A fluid transmission comprising a rotary pump including a casing and a rotor adapted to provide suction and pressure strokes with respect to the casing, a drive shaft connected to the rotor of the pump, a driven shaft connected to the casing of the pump, said pump having inlet and outlet ports, positioned respectively near the beginning and end of the pressure stroke of the pump, a chamber connected to the inlet and outlet ports, and means for supplying fluid under any desired pressure to the chamber.

6. A fluid transmission comprising a rotary pump including a casing and a rotor adapted to provide suction and pressure strokes with respect to the casing, a drive shaft connected to the rotor of the pump, a driven shaft connected to the casing of the pump, said pump having inlet and outlet ports, positioned respectively near the beginning and end of the pressure stroke of the pump, a chamber connected to the inlet and outlet ports, and means for supplying fluid under any desired pressure to the chamber, and means associated with the chamber for absorbing pressure shocks in the system.

7. A fluid transmission comprising a fixed housing, a rotary pump rotatably journaled in the housing and including a casing and a rotor adapted to provide suction and pressure strokes with respect to the casing, a drive shaft journaled in the housing and connected to the rotor of the pump, a driven shaft journaled in the housing and connected to the casing of the pump, said pump having inlet and outlet ports, a pressure chamber rotatable with the pump casing for supplying fluid to the inlet port and for receiving the fluid from the outlet port, and a master pressure cylinder mounted outside the housing for supplying fluid under pressure to the pressure chamber.

8. A fluid transmission comprising a plurality of aligned but out of phase rotary pumps, each pump including a casing and a rotor adapted to provide suction and pressure strokes with respect to the casing, a drive shaft connected to the tied-together rotors of the pumps, a driven shaft connected to the connected casings of the pumps, said pumps having inlet and outlet ports, a pressure chamber for supplying fluid to the inlet port and for receiving the fluid from the outlet port, and a master cylinder for controlling the pressure in the pressure chamber.

9. A fluid transmission comprising a plurality of aligned but out of phase rotary fluid pumps, each pump including a casing and a rotor adapted to provide suction and pressure strokes with respect to the casing, a drive shaft connected to the tied-together rotors of the fluid pumps, a driven shaft connected to the connected casings of the fluid pumps, said pumps having inlet and outlet ports, a pressure chamber for supplying fluid to the inlet port and for receiving the fluid from the outlet port, a master cylinder for controlling the pressure in the pressure chamber, and means associated with the pressure chamber for absorbing sudden pressure shocks to the fluid system.

10. A fluid transmission comprising a driven shaft, a cylindrical casing secured to the driven shaft, a pressure chamber surrounding the casing, a drive shaft, a rotor cylinder secured to the drive shaft and eccentrically positioned in the cylindrical casing, a plurality of radially-extending, axially directed blades slidably carried at circumferentially spaced points about the rotor cylinder, and means for supplying fluid under any desired pressure to the pressure chamber, said cylindrical casing having an exhaust port opening to the pressure chamber and having an inlet port opening to the pressure chamber and positioned to be open to the inside of the cylindrical casing only after the complete suction stroke of each blade carried by the rotor cylinder.

11. A fluid transmission comprising a driven shaft, a casing secured to the driven shaft and having an eccentrically-positioned cylindrical opening therein, a pressure chamber surrounding the casing, a drive shaft in alignment with the driven shaft, a rotor cylinder secured to the drive shaft and received in the cylindrical opening in the casing so that the rotor cylinder and opening are tangent to each other at one point, a plurality of radially-extending, axially directed blades slidably carried at circumferentially spaced points about the rotor cylinder, and means for supplying fluid under any desired pressure to the pressure chamber, said cylindrical casing having an exhaust port opening to the pressure chamber and having an inlet port opening to the pressure chamber and positioned to be open to the inside of the cylindrical casing only after the complete suction stroke of each blade carried by the rotor cylinder.

12. A fluid transmission comprising a driven shaft, a casing secured to the driven shaft and having an eccentrically-positioned cylindrical opening therein, a pressure chamber surrounding the casing, a drive shaft in alignment with the driven shaft, a rotor cylinder secured to the drive shaft and received in the cylindrical opening in the casing so that the rotor cylinder and opening are tangent to each other at one point, a plurality of radially-extending, axially-directed blades slidably carried at circumferentially spaced points about the rotor cylinder, means for supplying fluid under any desired pressure to the pressure chamber, said cylindrical casing having an exhaust port opening to the pressure chamber and having an inlet port opening to the pressure chamber and positioned to be open to the inside of the cylindrical casing only after the complete suction stroke of each blade carried by the rotor cylinder, and means associated with the pressure chamber for cushioning sudden pressure shocks to the fluid system.

13. A fluid transmission comprising a stationary housing, a drive shaft, a combined radial and thrust bearing journalling the drive shaft in the housing, a driven shaft, a combined radial and thrust bearing journalling the driven shaft in the other side of the housing and in alignment with the drive shaft, a casing secured to the driven shaft and having a reduced end portion surrounding the drive shaft, a combined radial and thrust bearing journalling the reduced end portion of the casing in the housing, a combined radial and thrust bearing associated with the reduced end portion of the casing and journalling the drive shaft, said casing having an eccentrically-positioned cylindrical opening therein, a pump rotor received in the cylindrical opening and splined to the drive shaft, a stud on the end of the rotor remote from the drive shaft, a combined radial and thrust bearing carried by the casing and journalling the stud, a pressure chamber surrounding the casing, a master pressure cylinder, means connecting the master pressure cylinder to the pressure chamber, said casing having an outlet port from the discharge side of the fluid rotor to the pressure chamber and an inlet port to the pressure chamber and positioned between the end of the suction stroke and the middle of the pressure stroke, and a displacement cylinder associated with the pressure chamber.

14. A fluid transmission comprising a stationary housing, a drive shaft, a bearing journalling the drive shaft in the housing, a driven shaft, a bearing journalling the driven shaft in the other side of the housing and in alignment with the drive shaft, a casing secured to the driven shaft and having a reduced end portion surrounding the drive shaft, a bearing journalling the reduced end portion of the casing in the housing, a bearing associated with the reduced end portion of the casing and journalling the drive shaft, said casing having an eccentrically-positioned cylindrical opening therein, a pump rotor received in the cylindrical opening and splined to the drive shaft, a stud on the end of the rotor remote from the drive shaft, a bearing carried by the casing and journalling the stud, a pressure chamber surrounding the casing, a master pressure cylinder, means connecting the master pressure cylinder to the pressure chamber, said casing having an outlet port from the discharge side of the rotor to the pressure chamber and an inlet port to the pressure chamber and positioned between the end of the suction stroke and the middle of the pressure stroke, and a displacement cylinder associated with the pressure chamber.

15. A fluid transmission comprising a stationary housing, a drive shaft, a bearing journalling the drive shaft in the housing, a driven shaft, a bearing journalling the driven shaft in the other side of the housing and in alignment with the drive shaft, a casing secured to the driven shaft and having a reduced end portion surrounding the drive shaft, a bearing journalling the reduced end portion of the casing in the housing, a bearing associated with the reduced end portion of the casing and journalling the drive shaft, said casing having an eccentrically-positioned cylindrical opening therein, a pump rotor received in the cylindrical opening and splined to the drive shaft, a stud on the end of the rotor remote from the drive shaft, a bearing carried by the casing and journalling the stud, a pressure chamber surrounding the casing, a master pressure cylinder, and means connecting the master pressure cylinder to the pressure chamber, said casing having an outlet port from the discharge side of the rotor to the pressure chamber and an inlet port to the pressure chamber and positioned between the end of the suction stroke and the middle of the pressure stroke.

16. A fluid transmission comprising a stationary housing, a drive shaft, a bearing journalling the drive shaft in the housing, a driven shaft, a bearing journalling the driven shaft in the other side of the housing and in alignment with the drive shaft, a casing secured to the driven shaft and having a reduced end portion surrounding the drive shaft, a bearing journalling the reduced end portion of the casing in the housing, a bearing associated with the reduced end portion of the casing and journalling the drive shaft, said casing having an eccentrically-positioned cylindrical opening therein, a rotary pump rotor received in the cylindrical opening and splined to the drive shaft, a stud on the end of the rotor remote from the drive shaft, a bearing carried by the casing and journalling the stud, and a pressure chamber surrounding the casing.

GEORGE W. OWENS.